June 18, 1940.   F. W. PEEL ET AL   2,204,617
METHOD AND APPARATUS FOR INTERNALLY ELECTRICALLY HEATING EXPANDING RUBBER
Filed June 12, 1935   3 Sheets-Sheet 1
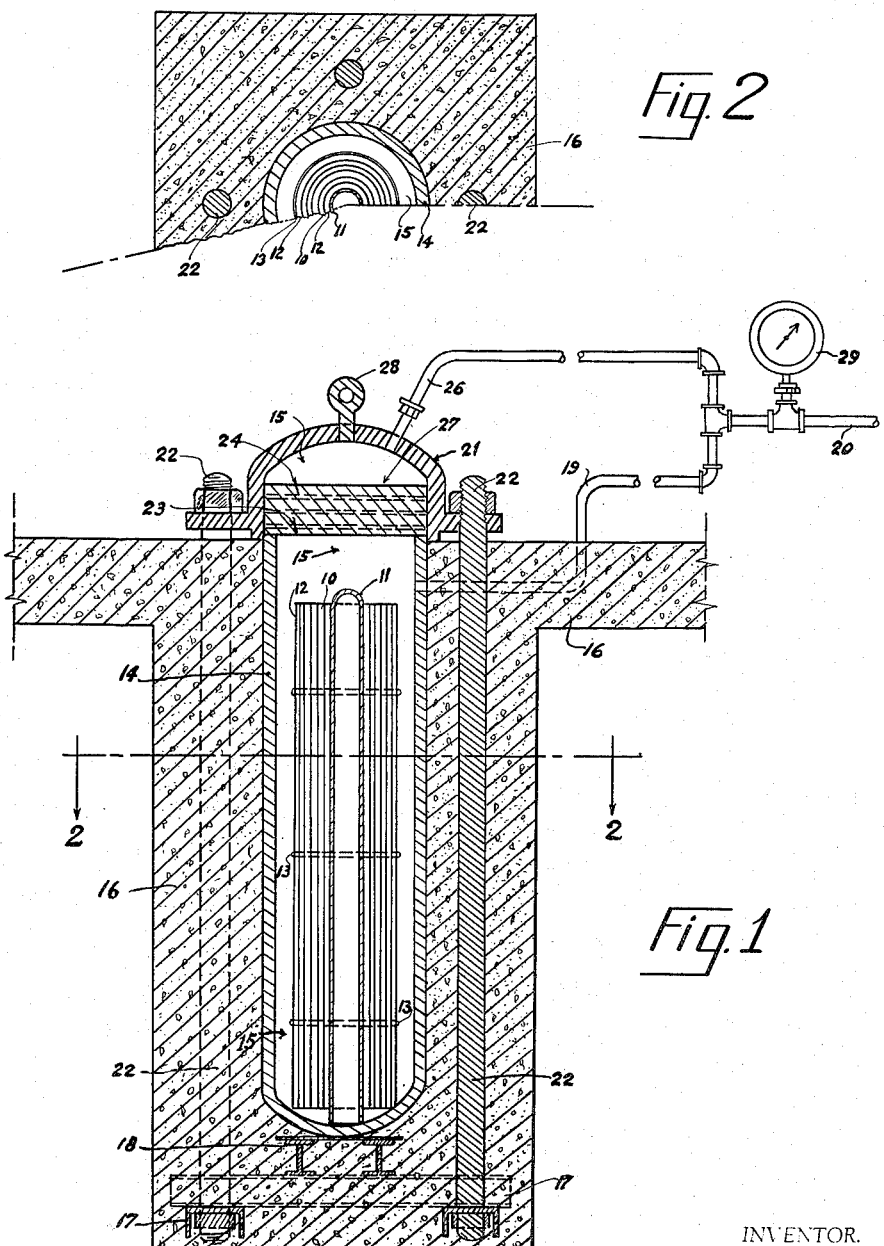
INVENTOR.
Frederick William Peel
Charles James Kilduff
BY
Samuel Ostrolenk
ATTORNEY.

June 18, 1940.  F. W. PEEL ET AL  2,204,617
METHOD AND APPARATUS FOR INTERNALLY ELECTRICALLY HEATING EXPANDING RUBBER
Filed June 12, 1935   3 Sheets-Sheet 2
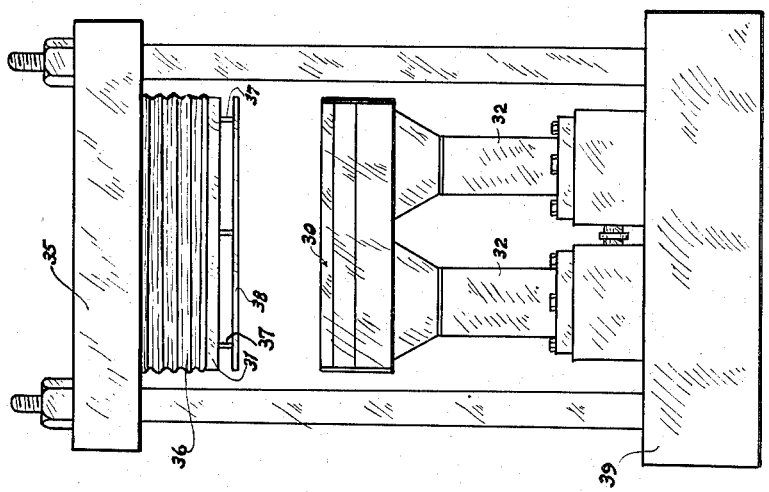
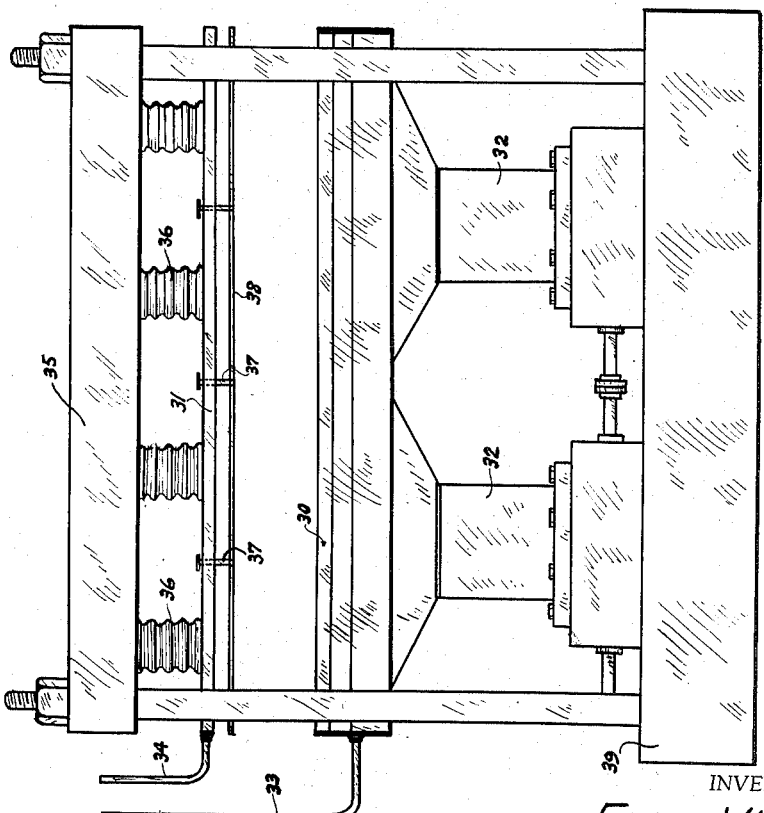
INVENTOR.
Frederick William Peel
BY Charles James Kilduff
Samuel Ostrolenk
ATTORNEY.

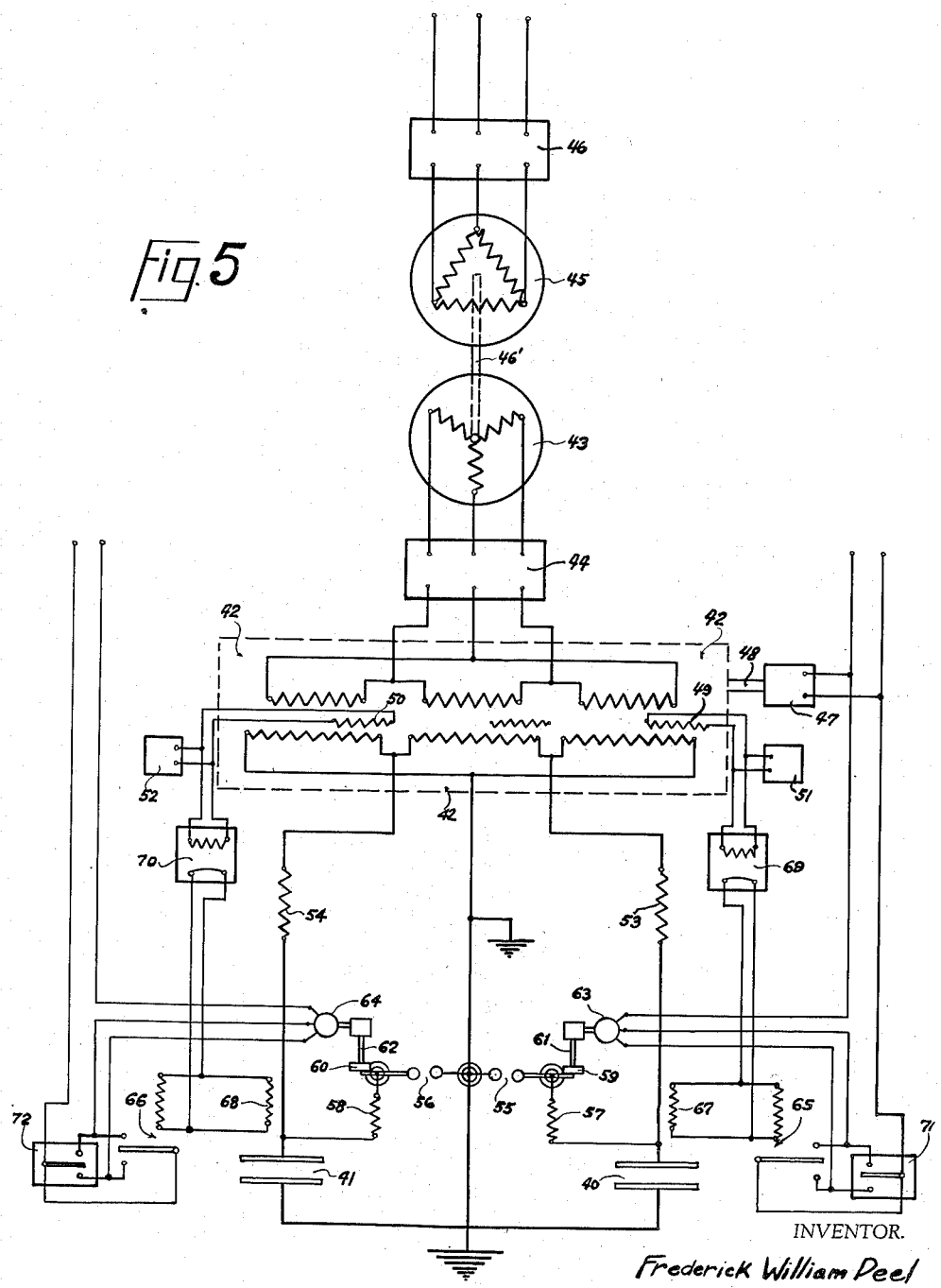

Patented June 18, 1940

2,204,617

UNITED STATES PATENT OFFICE 2,204,617

METHOD AND APPARATUS FOR INTERNALLY ELECTRICALLY HEATING EXPANDING RUBBER

Frederick William Peel, Severna Park, and Charles James Kilduff, Baltimore, Md.

Application June 12, 1935, Serial No. 26,164

4 Claims. (Cl. 18—17)

Our invention relates to a novel process of and means for making expanded rubber material.

There are two types of processes for manufacturing expanded rubber. In one type, the dough is subjected to a gas pressure of several thousand pounds to thoroughly impregnate the rubber with the gas. This gas expands and is released during the final heating step. This expansion of the gas causes the rubber to expand too, resulting in an expanded cellular rubber, in which the individual minute cells are sealed from each other.

In this type of process of manufacture of expanded rubber, as described in the Denton Patent 1,905,269, dated April 25, 1933, the rubber mix is subjected to the gas pressure of several thousand pounds simultaneously with the application of heat for partially vulcanizing the rubber to enable it to retain the gas it is saturated with. The gas saturated rubber is then applied to a press or mold, where pressure and proper heating are applied to produce the finished expanded rubber material. The heating is applied externally to the rubber, by using steam platens, or electric or gas ovens.

In another process of this type of manufacture of expanded rubber, as described in application Serial No. 20,364, filed May 8, 1935, of Peel, the partial vulcanization is completed before subjecting the rubber compound to the gassing chamber. The final curing and expansion is accomplished by using a coiled metal heating element in contact with the rubber surface. The length of rubber is coiled with a metal sheet which is heated as electricity is conducted through it.

In another type of process of manufacture of expanded rubber, the dough is saturated with liquid instead of gas. By using a proper composition, partial vulcanization of the dough may be dispensed with to retain the liquid or proper moisture. The dough is subjected to the liquid at great hydraulic pressure in an autoclave. The final curing and expanding of the rubber is accomplished similarly as described above. External pressure and heating is applied. The liquid in the saturated dough vaporizes. The steam functions as the gas discussed in the other type of process does. The rubber expands and is cured to form the finished product.

All the processes used in the manufacture of expanded rubber have been found to have distinct limitations as to the thickness of the rubber compound which may be treated, due to the difficulty in applying a uniform temperature throughout the section or mass of a thick rubber material. All processes have heretofore heated the rubber by external means, such as by steam or steam platens, by gas or electrical ovens, or by electrical plates.

In the external application of heat to the dough, a temperature decrease gradient results from the surface or surfaces of heat application into the section of the rubber. Since a uniform heating throughout the section of the dough is essential for the production of a homogeneous material, restrictions on commercial thickness have heretofore existed.

We have found that it is possible to effect a homogeneous final curing of thick rubber material by electrically generating heat internally in the rubber. Our process is applicable to any type of manufacture of expanded rubber, including those using gas saturated dough, or liquid saturated dough. Our process of internal heat generation can be applied to other fields of manufacture, such as the cooking of meat, the exploding of wheat, etc. However, we shall limit our illustrations to the manufacture of expanded rubber, using liquid saturation of the dough.

The dough, saturated with an aqueous salt solution, is placed between the electrical plates of the hydraulic press illustrated in Figs. 3 and 4 and hereinafter described, and heat is generated internally in the rubber by the application of a high voltage to the plates of the press. The processes of internal heat generation include that by conduction, using direct or alternating current; by dielectric absorption and hysteresis using alternating current; or by a combination, using alternating current.

When the dough is applied to the hydraulic pressure of the autoclave, considerable time and difficulty is involved in the attachment of the lid of the autoclave to prevent leakage. We have found a novel means of expediting this step by providing an hydraulic combination lid as hereinafter described.

Accordingly, an object of our invention is to provide a novel process of making expanded rubber.

Another object of our invention is to provide a novel process of making expanded rubber in which the rubber compound is internally heated.

Still another object of our invention is to provide a novel method of heating the rubber compound in the process of making expanded rubber.

A further object of our invention is to provide a novel means for sealing the lid of the autoclave to prevent leakage in the process of making expanded rubber.

A still further object of our invention is to provide novel means for electrically generating heat internally in the rubber compound in the process of making expanded rubber.

There are other objects of our invention which, together with the foregoing, will appear in the detailed description which is to follow in connection with the drawings, in which:

Figure 1 is a vertical section through the water pressure chamber, showing the hydraulic combination lid.

Figure 2 is the horizontal section 2—2 through the water pressure chamber as drawn in Fig. 1.

Figure 3 is a side view of the electric curing plate and press.

Figure 4 is an end view of the electric curing plate and press.

Figure 5 is a schematic wiring diagram of the apparatus of the electrical curing process.

In carrying out our invention, we have used the following rubber compound, and have obtained a very satisfactory expanded rubber product.

| | Per cent |
|---|---|
| Pale crepe rubber | 76.0 |
| Light calcined magnesia | 6.1 |
| Lithophone | 6.1 |
| Paraffin wax | 3.0 |
| Zinc oxide | 3.0 |
| Sulphur | 4.6 |
| Diphenylguanidine | 0.5 |
| Agerite | 0.5 |
| Carbon black | 0.2 |

This mixture, stated in percentages by weight, is identical to the one Peel has also preferred for the purpose of illustration in the application Serial No. 20,364, filed May 8, 1935. Nevertheless, as will be clear from the description to follow, any other desired mix may be used in our process.

We have found that the use of metallic oxides or finely divided metals added to the rubber compound materially assists the process. However, in many rubber compounds these metallic oxides or metals are not essential, due to the fact that these compounds more readily absorb the moisture needed to expand the rubber.

The dough is prepared in the manner described in the application, Serial No. 717,550, filed March 27, 1934, or may be otherwise individually mixed on the mill in a manner well known in the art of rubber compounding. After being masticated and calendered in the usual procedure known in the rubber art, the sheet of dough 10 is coiled up on a mandrel 11 together with a metal spacer 12 as shown in Figures 1 and 2. The spool of rubber dough 10, metal spacer 12 and mandrel 11 is then bound with several steel retention bands 13 to hold the unit integral under pressure. The whole is then placed in an autoclave chamber 14 and is submerged under an aqueous salt solution 15. The autoclave or water pressure chamber 14 is set into a concrete foundation 16 with steel girder reenforcement 17 and is supported directly on the beams 18. Pipe line 19 connects the liquid of the chamber to the hydraulic lines, to the valves, and accumulator or pump attached at the end of line 20.

The head 21 is fastened moderately tight in position over the chamber 14 by means of four staybolts 22. A copper gasket 23 is set at the point of contact of the cover and chamber. A set of piston rings 24 and a piston 25 acts to seal in any leakage as the pressure is raised in the chamber as follows: A pipe line 26 connects the liquid 27 in the head 21 to the same hydraulic system and pressure as the chamber. The pressure is raised simultaneously in the hydraulic combination lid and in the chamber, by either an accumulator or hydraulic pump, as is well known in the hydraulic art. The piston, piston rings and gasket form a very satisfactory seal to prevent leakage. The installation of such a cover or lid onto the chamber is a matter of a minute or two. The head 21 is brought into position with the aid of the eyebolt 28, and set with a few bolts. The present methods require twelve or more large two inch bolts with careful tightening and adjusting. The combination hydraulic lid as herein described affords a rapid, simple and effective cover. A pressure gauge 29 indicates the hydraulic pressure in the lines to the chamber and lid.

The rubber is subjected to this aqueous salt solution with a pressure and length of time that varies in accordance with the compound mixed, and thickness used. The spooled rubber is removed and unrolled from the mandrel. The surface of the rubber is wiped and then thoroughly chalked. The dough is cut to the desired size, and is ready for the final curing step.

Figure 3 is a side view, and Figure 4 is an end view of the electric curing plate and press 39. The saturated rubber is now placed between the plates 30 and 31 of the press 39. The lower plate 30 is attached to the hydraulic rams 32 of the press, and is connected to the ground by cable 33, as well as to the grounded terminal of the high potential transformer that supplies the high voltage alternating current, or to the grounded terminal of a high potential supply unit. The upper plate 31 is insulated from the yoke 35 of the press with Bakelite blocks 36. Attached to the upper plate 31 with machined guide pins 37 is a thin sheet of steel 38 which forms a movable plate, and rests on top of the rubber placed in position on the bottom plate 30 of the press 39. This movable plate 38 is free to move vertically as the rubber expands, until it is forced against the upper insulated plate 31. These upper plates 31 and 38 are connected to the cable 34 which connects to the high tension side of the transformer or high voltage supply unit.

The current used in this process may be alternating or direct current. However, due to the necessity of high voltage for this process, it is more practicable to use alternating current. The cables 33 and 34 of the plates are connected to a high voltage source. The press is set according to the required final thickness of the rubber material. The movable plate 38 rests on the upper surface of the aqueous saturated dough. A conduction current flows between the plates and through the section of the rubber. The aqueous salt solution assists in the passage of this conduction current. Metallic oxides of finely divided metals in the rubber compound also assist in the conduction of current at this stage. The voltage necessary to cause current flow through the rubber is primarily determined by the amount of moisture it contains. The starting voltage of this process may be as low as 1000 or as high as 6000 volts. This current flow through the rubber causes internal heating, and as soon as sufficient heat is generated in the rubber, expansion starts and continues until prevented by the setting of the hydraulic press for the final thickness.

As the rubber expands, due to the vaporization of the entrenched liquid, the resistance of the dough increases and a greater voltage is required to maintain proper internal heating. Hence, as the rubber starts to expand, the voltage applied to the plates is increased to a point where corona appears between the loose upper plate and the rubber. As the rubber further expands, the corona tends to diminish, and the voltage is further increased in order to keep the rubber in an ionized condition. Care must be taken to prevent the voltage across the rubber from becoming too high, in order not to cause a discharge through the rubber. Special means, in the form of an automatic spark gap connected across the cables feeding the press, provide for this, and is described in detail hereinafter.

We have found that by making use of the dielectric effect of the rubber, we can produce a greater internal heating, and a more uniform heating over a period of time. By using alternating current of high or low frequency, the two plates of the press act as the plates of a condenser, and the dough between them acts as the dielectric. We have found that a frequency of 500 cycles is most suitable for the rubber compound we have described. We do not intend to be restricted as to the frequency of the applied voltage, since the optimum frequency depends on the type of compound or material used.

At the start of this process of final curing, the conduction current through the aqueous solution in the rubber predominates, and the starting voltage is accordingly lower. However, as the rubber expands and becomes dry, it becomes a poor conductor but a good dielectric. To cause a greater current through the rubber and hence greater internal heating thereof, it is necessary to increase its internal electrical losses. The loss due to the conduction or passage of current through the rubber is an electrical resistance heating effect. There is also an electrical heating effect due to dielectric hysteresis and dielectric absorption in the rubber acting as a dielectric of a condenser formed by the plates of the press for alternating current.

We have found that at about 500 cycles the dielectric materials ionize at a lower voltage. The dielectric losses occur when the moisture dries out and the rubber regains its dielectric properties. The high frequency increases the dielectric hysteresis and dielectric absorption losses due to the rapid reversals of the current.

Figure 5 is a schematic wiring diagram of the electrical curing process. We have indicated two presses, 40 and 41, connected to a system of three phase supply of alternating current. A single or poly-phase system may be employed, but a three phase supply is preferable for the following reasons.

We have found that for best operation, the applied voltage wave should be as nearly sinusoidal as possible. Harmonic content of the wave form causes the voltage wave to be peaked, and the rubber will break down more rapidly. The ratio of maximum to effective value of the voltage is increased with a peaked voltage wave. The effective value of the voltage determines the amount of heating current. An increase of this ratio increases the voltage strain in the rubber, which strain depends on the peak value of the voltage applied. Hence for maximum heating effect in the rubber, and minimum voltage strain, a minimum ratio is preferable, and a purely sinusoidal applied voltage wave form is best.

Another reason for minimizing the harmonic content of the voltage wave is that the series circuit consisting of the transformer secondaries, the reactance coils, and the press which acts as a condenser, may become electrically resonant at one of the higher harmonics. An abnormal increase in current would result therefrom, drawing more power from the power source, and contribute little more to the heating process, since the power will be consumed by the resistance of the circuit.

To eliminate the possibility of a third harmonic, due to high magnetic densities in the transformer, or field distortion in the generator, it is best to use a three phase alternating current system, as shown in Fig. 5. A bank of voltage step-up transformers 42, three transformers connected in delta, no third harmonic or its multiple will occur in the voltage wave output thereof. The primary of the high tension transformers 42 are connected to a three phase Y connected alternating current generator 43 through an oil switch 44. If the armature coils of this alternator 43 have a five-sixths pitch, there will be no third harmonics in the output, and the fifth and seventh harmonics will be negligibly small.

The alternator 43 is a 500 cycle generator of a motor generator set. A three phase synchronous motor 45 is the driving motor of this motor generator unit coupled by shaft 46'. This motor 45 is connected to the incoming three phase 60 cycle power lines through an oil switch 46.

We use transformers whereby the output voltage is regulated by a movable primary coil in each transformer. This method of voltage regulation operates simultaneously on the three transformers comprising the delta bank 42, by means of a control motor 47, schematically shown, coupled to the three primaries by shafting 48, and eliminates any switching for voltage changes. Smooth, continuous, and wide voltage changes are feasible with no voltage transients due to switching arcs, which transients would act to discharge through the rubber. An alternative voltage regulation method is to control the output voltage of the alternator 43 by adjustments of its field strength.

The pilot coils 49 and 50 of the transformers are connected to the respective voltmeters 51 and 52, to indicate the output voltage of the transformers. One press 40 is connected between ground and one phase of the output of the transformer bank 42; another press 41, is connected similarly across another phase. Presses 40 and 41 have a reactance coil, 53 and 54 respectively, connected in series with their high potential lead from the transformer bank. These reactance coils limit any peak or surge voltage or transient, due to any cause, to the presses, which surge would otherwise discharge through the rubber and impair it.

At the start of the curing process, the proper low starting voltage is applied to the plates by regulating the transformer bank 42 output voltage by means of the control motor 47. As the conduction current heats up the rubber, and causes it to expand, the moisture vaporizes, and the dielectric properties of the rubber become effective. The voltage is gradually increased, until a corona discharge appears between the movable upper plate 38 and the rubber. The voltage is then further increased when the corona tends to diminish.

A sphere spark gap 55 is connected across the wires feeding the presses 40, and another sphere spark gap 56 is connected across the wires feeding the press 41. A coil of high reactance 57 is connected in series with spark gap 55, and reactance 58 is connected in series with spark gap 56. One side of each spark gap is connected through suitable gears, 59 and 60, and a Bakelite rod, 61 and 62, to a small motor or magnet 63 and 64, which adjusts the spacing between the spheres of the spark gaps 55 and 56 respectively. These motors or magnets, 63 and 64, are respectively connected to relay 65 and 66, which relay is controlled by a current transformer 67 and 68, placed in the high voltage circuit as shown in Figure 5. The motor or magnet 63 and 64 are connected with three wires to permit operation in forward or reverse directions, for proper control. A single pole double throw hand switch 71 and 72 is connected in this circuit to permit manual control of the spark gaps 55 and 56 respectively. When the voltage tends to break down the rubber, the relay, 65 and 66, operates the motor or magnet, 63 and 64, which shortens the distance between the spheres of the respective spark gaps 55 and 56, and the discharge takes place across the gap instead of through the rubber.

At the start of this process, when the applied voltage is low and the current high, due to direct conduction of the current through the saturated aqueous salt solution, the current transformers 67 and 68 will have a large current through them, and would tend to operate the spheres of the spark gaps. However, we have caused the current transformers 67 and 68 to be short circuited during this period, and prevent the spark gaps from closing. This is accomplished with a contact breaking voltmeter, 69 and 70, which is energized by the pilot coils 49 and 50 respectively on the transformer bank 42, or alternatively by an instrument transformer connected across the high voltage wires. After the voltage reaches a predetermined value, the contacts of the contact breaking voltmeter 69 and 70 open the short circuited secondary of the current transformer 67 and 68, and the automatic spark gap is placed in operation. The voltage regulating motor, 47, may also be controlled from these current transformers, making the operation entirely automatic.

After the rubber has been cured, the line oil switch 46 or transformer oil switch 44 is opened to stop the current flow through the rubber. There is appreciable stored energy in the rubber which has been acting as the dielectric of a condenser. The spheres of the spark gaps 55 and 56 are closed to short circuit and dissipate this stored electrical energy.

We have described two presses in simultaneous operation. They may be independently or separately operated, however.

Although we have described in detail the electrical curing process for aqueous impregnated rubber by internal heating, a similar process may readily be applied to gassed rubber compound, where the conduction current will necessarily be lower at the starting of the process. Although we have limited our illustrations and discussions to the treatment of rubber compounds, it will be apparent that other materials may likewise be heat treated internally, such as the cooking of meat, baking of bread, exploding of wheat and rice, treatment of sawdust and cork, etc.; and that variations and modifications may be made within the scope of the invention both in the constituent parts, and in the details shown and described, and we do not intend to be limited except as set forth by the appended claims.

We claim:

1. In a press for curing rubber dough admixed with an electrically reactive substance: a first platen having a first conducting surface yieldingly mounted; a second platen parallel to and movable with respect to said first platen, having a second conducting surface opposite said first surface; means for controlling the pressure upon rubber dough placed between said first and second surfaces; and means for conducting electric current to said first and second surfaces and through said dough whereby said dough is uniformly internally heated to vulcanizing temperature by electrical energy absorption.

2. In a press for curing rubber dough admixed with an electrically reactive substance: a first platen having a first conducting surface adapted to yieldingly press against the rubber dough; a second platen parallel to said first platen, said second platen having a second conducting surface; means for controlling the pressure upon rubber dough placed between said first and second surfaces; and means for conducting electric current to said first and second surfaces and through said dough whereby said dough is uniformly internally heated to vulcanizing temperature by electrical energy absorption.

3. The method of treating rubber by electric current which comprises impregnating the rubber with an electrically conducting solution, subjecting the rubber to a low frequency alternating current to internally electrically heat the rubber dough by conduction sufficient to gradually vaporize the solvent thereby rendering the rubber dough less and less conductive, and continuing to subject the rubber dough to alternating current after the solvent has substantially evaporated, whereby the rubber is additionally internally heated homogeneously to the vulcanizing temperature by the dielectric energy loss effects.

4. The method of treating rubber by electric current which comprises impregnating the rubber with an electrically conducting solution, subjecting the rubber to a low frequency alternating current of the order of five hundred cycles to internally electrically heat the rubber dough by conduction sufficient to gradually vaporize the solvent thereby rendering the rubber dough less and less conductive, and continuing to subject the rubber dough to alternating current after the solvent has substantially evaporated, whereby the rubber is additionally internally heated homogeneously to the vulcanizing temperature by the dielectric energy loss effects.

FREDERICK W. PEEL.
CHARLES J. KILDUFF.